United States Patent [19]
Read

[11] Patent Number: 5,480,270
[45] Date of Patent: Jan. 2, 1996

[54] CLUTCH FOR THREADING ATTACHMENT

[75] Inventor: Thomas J. Read, Rochester, N.Y.

[73] Assignee: Delaware Capital Formation, Inc., Wilmington, Del.

[21] Appl. No.: 236,025

[22] Filed: May 2, 1994

[51] Int. Cl.[6] ..................................................... B23G 1/20
[52] U.S. Cl. ........................ 408/140; 192/48.6; 35/41 R; 470/66
[58] Field of Search ..................................... 408/139, 140; 82/110; 470/66, 81; 192/48.1, 48.2, 48.5, 48.7, 48.9, 67 A, 35, 41 R, 45, 48.6

[56] References Cited

U.S. PATENT DOCUMENTS 1,813,480  7/1931  Brown ........................................ 470/66
2,114,626  4/1938  Brinkman ................................. 408/1 R
2,161,548  6/1939  Miller ........................................ 470/66

Primary Examiner—Daniel W. Howell
Attorney, Agent, or Firm—Shlesinger, Fitzsimmons & Shlesinger

[57] ABSTRACT

Each of the two alternately actualable clutches of a threading shaft includes a clutch disc keyed to the shaft, and positioned between two annular members. One of the members is rotated coaxially of the shaft by a driving gear, and the other is movable axially by the ball detents of a camming mechanism in one direction to grip the clutch disc frictionally between the annular members thereby to transmit the rotation of said driving gear to the shaft, and in the opposite direction to disengage the driving gear from the shaft.

10 Claims, 3 Drawing Sheets

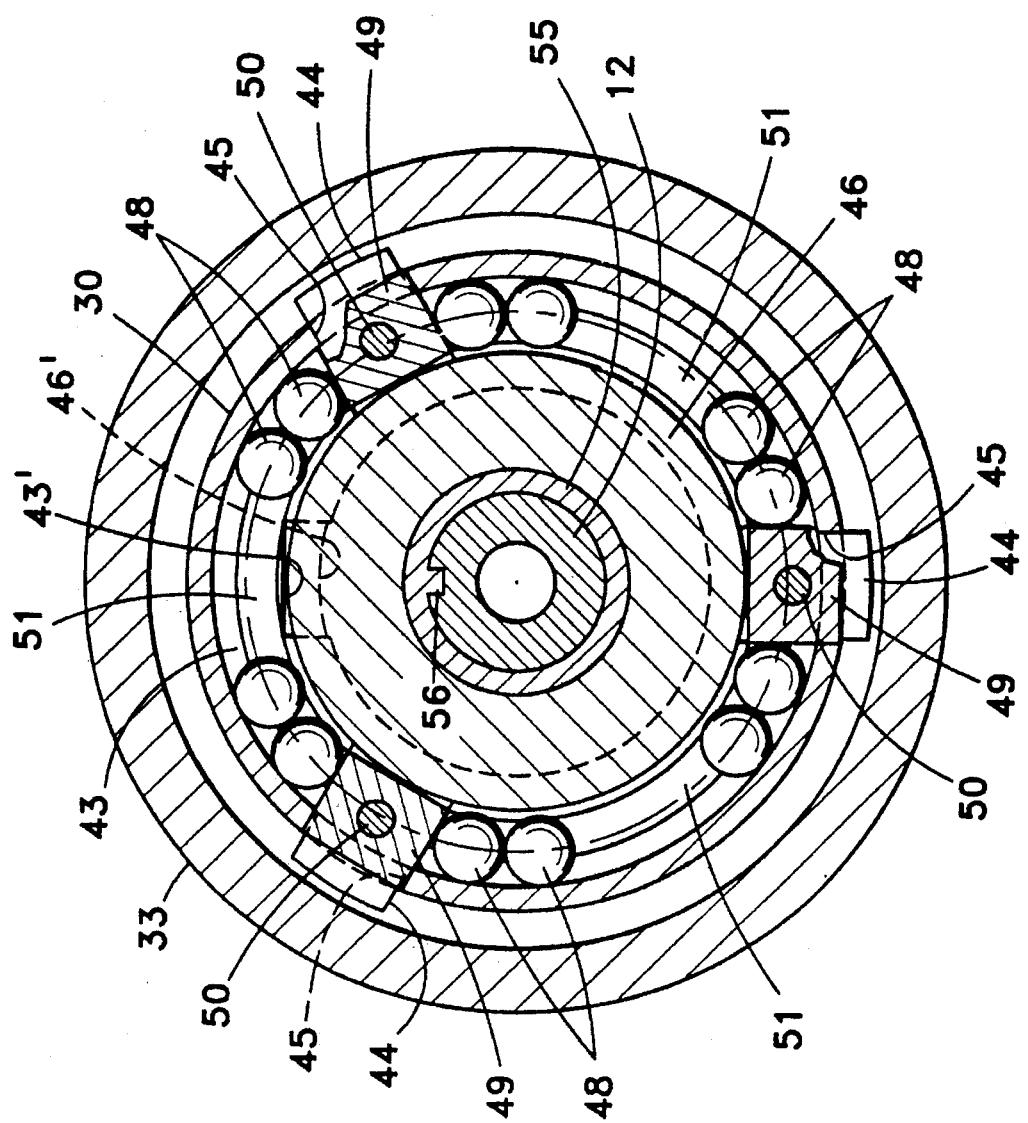

CLUTCH FOR THREADING ATTACHMENT

BACKGROUND OF THE INVENTION

This invention relates to multiple spindle screw machines, and more particularly to a threading attachment for such machines. Even more particularly, this invention relates to an improved clutch mechanism for use with such attachments.

Machines of the type described include a rotatably indexible head containing a plurality of rotatable work spindles which are mounted in the head for rotation about spaced, parallel axes. Each such spindle is capable of securing therein a piece of bar stock which can be rotated by the spindle during a machining operation. Such machines also generally include a plurality of so-called tool spindles which are mounted for movement into and out of operative positions relative to the work spindles, and which are capable of holding a plurality of different tools for rotation relative to the work spindles. One such machine, which is disclosed for example in U.S. Pat. No. 2,114,626, includes a tool supporting spindle which is identified also as a threading spindle. That particular spindle is designed to support a threading tool adjacent a piece of bar stock, or the like, and for selective engagement with the periphery of the bar stock for the purpose of forming threads thereon.

At least certain threading spindles of the type described heretofore have utilized clutch mechanisms for selectively operating the threading spindle at different speeds. One disadvantage of prior such clutch mechanisms, however, is that after repeated use the confronting clutch faces of a respective mechanism tend to slip one relative to the other unless the mechanism is frequently adjusted to maintain the force neccessary for retaining the clutch faces in operative engagement with each other during use. Also, prior such clutch mechanisms have been rather costly and difficult to install.

It is an object of this invention, therefore, to provide for threading attachments of the type described, an improved clutch mechanism which requires only minimal adjustment after prolonged use, and which is more inexpensive to produce and assemble than prior such mechanisms.

Another object of this invention is to provide an improved clutch mechanism of the type described which has a longer life span, and which requires even less space than prior such clutch mechanisms.

Other objects of the invention will be apparent hereinafter from the specification from the recital of the appended claims, particularly when read in connection with the accompany drawings.

SUMMARY OF THE INVENTION

Each of two alternately actuatable includes a bronze ring keyed to a threading shaft or spindle, and having thereon an enlarged diamter disc flange to opposite sides of which are fastened plastic clutch pads of a non-asbestos variety. Each disc flange and its clutch pads are positioned between an annular clutch plate and a clutch collar that is fixed to one of two drives gears for the threading spindle. At the side thereof remote from the disc flange the clutch plate is engaged by a circular array of ball cams, which are housed within a clutch shifting sleeve between the clutch plate and an actuating ring that is disposed coaxially in the clutch shifting sleeve.

The sleeve is movable axially of the spindle and selectively between an actuating position in which an inclined surface in its bore urges the ball cams radially inwardly relative to the actuating ring and along inclined camming surfaces on the rings, and in such manner that the clutch plate is shifted axially of the spindle in a direction to cause the disc flange and its pads to be gripped frictionally between the clutch plate and the clutch collar, whereby rotation of the one drive gear is transmitted to the threading spindle. When the clutch shifting sleeve is retracted axially relative to its clutch actuating position, the ball cams are permitted to shift radially outwardly relative to the actuating ring, thus deactivating the associated clutch mechanism.

THE DRAWINGS

FIG. 3 is a slightly enlarged sectional view taken generally along the line 3—3 in FIG. 2 looking in the direction of the arrows.

DETAILED DESCRIPTION OF THE PREFERRED EMBODIMENTS

Figure 1:
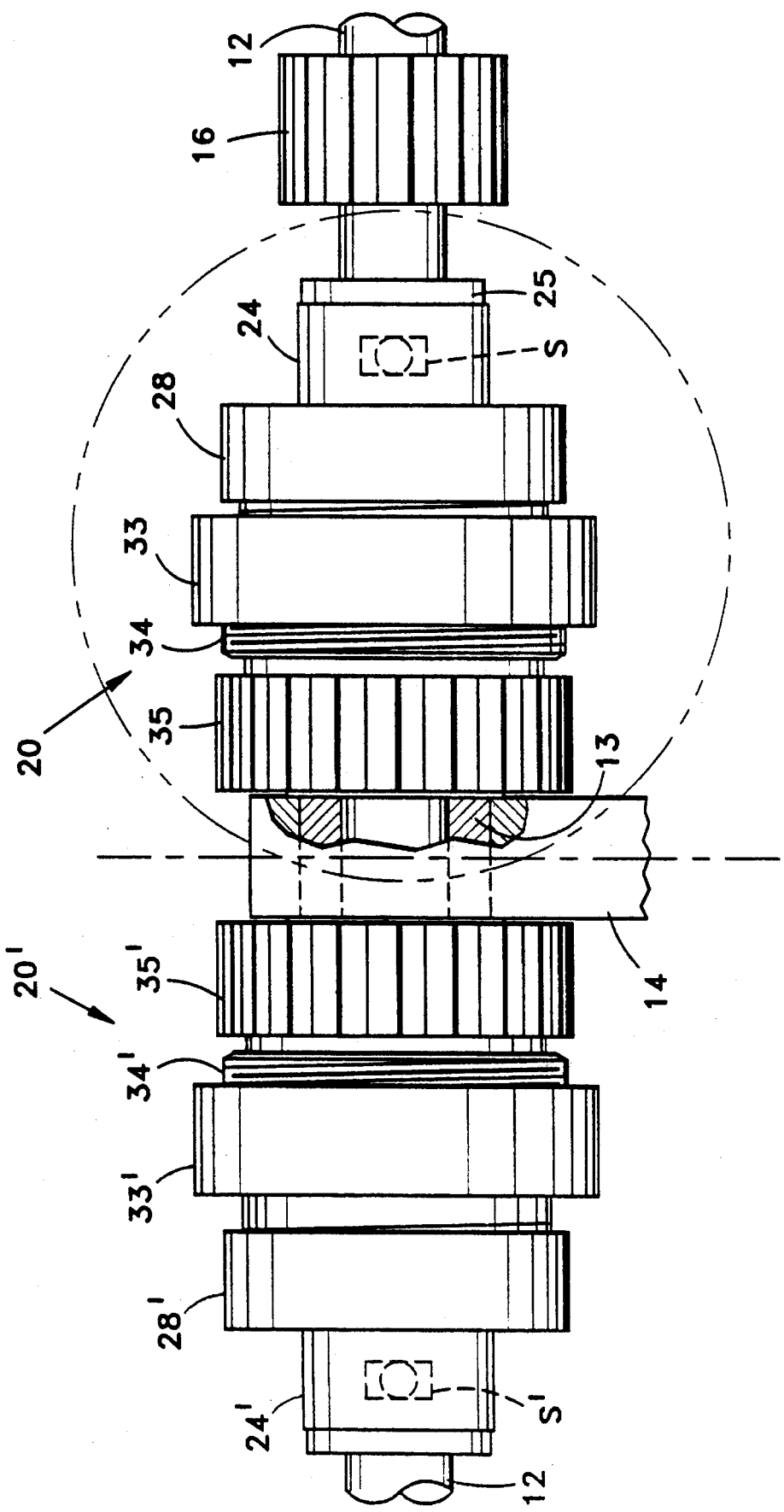
FIG. 1 is a fragmentary side elevational view of the threading spindle of a multiple spindle screw machine threading attachment having thereon a pair of clutch mechanisms made according to one embodiment of this invention, one of such clutch mechanisms being enclosed in a circle indicated by broken lines.

Referring now to the drawings by numerals or reference, and first to FIG. 1, 12 denotes a threading clutch shaft, that forms part of a threading attachment on a multiple spindled screw machine. The fragmentary portion of shaft 12 that is illustrated in FIG. 1, is journaled intermediate its ends in an annular center bearing 13, which is secured in an opening in a stationary bracket or leg 14 that forms part of the machine frame. Adjacent one end thereof (the right end in FIG. 1), shaft 12 has secured thereon a threading clutch shaft gear 16, which is meshed in a conventional manner with a gear train (not illustrated), that drives the associated threading spindle of the machine. Since the connection between the threading clutch shaft 12 and the threading spindle is conventional, it has not been illustrated herein. Also mounted on shaft 12 adjacent opposite sides, respectively, of the machine frame bracket 14 are two separate clutch mechanisms which are denoted generally by the numerals 20 and 20'. As noted in greater detail hereinafter, one or the other of the two clutch mechanisms 20 and 20' is normally disposed in an operative or active position in which it effects rotation of the shaft 12 at a predetermined speed. In practice, clutch mechanism 20', when activated, is designed to drive shaft 12 and hence gear 16 at a so-called low speed, while clutch mechanism 20, when activated, operates to drive shaft 12 and hence gear 16 at a so-called high speed. Since each of the mechanisms 20 and 20' is generally similar in construction, only the clutch mechanism 20 will be described in greater detailed hereinafter.

Figure 2:
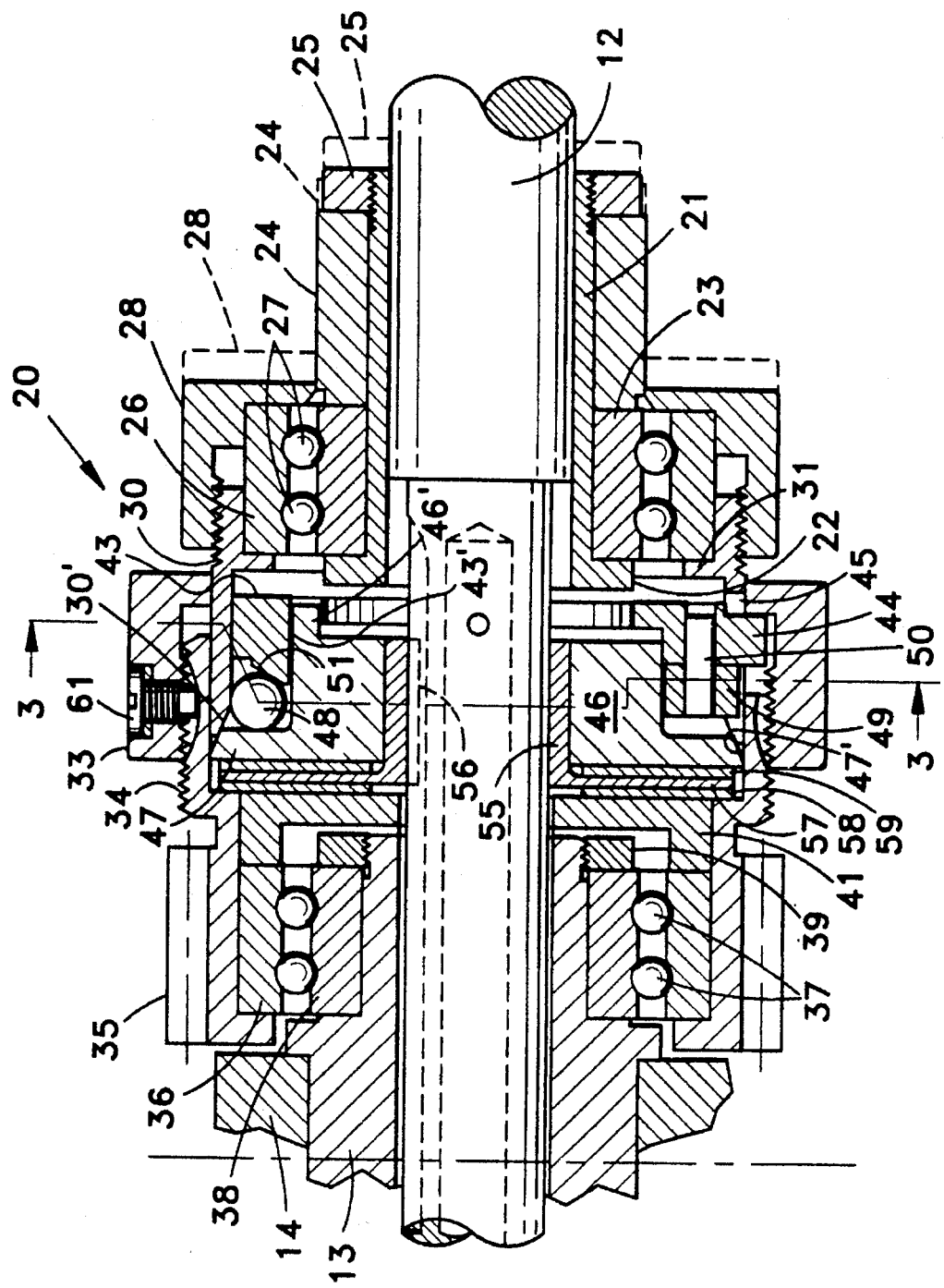
FIG. 2 is a slightly enlarged fragmentary sectional view through the center of the clutch mechanism enclosed within the broken line circle of FIG. 1.

For example, referring now to the clutch mechanism 20 as shown in FIG. 2, 21 denotes an annular sleeve bushing mounted on shaft 12 coaxially thereof, and having at one end thereof (the left end is shown in FIG. 2) an enlarged-diameter, circumferential end flange 22. Mounted on bushing 21 coaxially thereof, and secured against the inside surface of its end flange 22, is the annular, inner race 23 of a ball bearing unit. Race 23 is held snugly against flange 22 by an annular clutch shifting sleeve 24, which is secured on bushing 21 coaxially thereof by a nut 25 that threads onto the end of bushing 21 remote from its flange 22. The outer race 26 of this ball bearing unit, which is separated from the inner race 23 by a plurality of ball bearings 27, is seated at one end coaxially in a counterbore in a sleeve nut 28, which at one end surrounds the shifting sleeve 24, and which at its opposite end is threaded onto one end of a clutch actuating sleeve 30. Sleeve 30 has formed intermediate its ends an internal, circumferential flange 31, which engages the end of the ball race 26 remote from the bottom of the sleeve nut 28, whereby the race 26 is secured snugly by the nut 28 in one end of sleeve 30.

As noted hereinafter, sleeve 24 is adapted to be shifted axially on shaft 12 between an operative postion (solid line position as shown in FIG. 2) in which it actuates the clutch mechanism 20, and a retracted or inactive position (broken line position in FIG. 2), in which the clutch mechanism 20 is disengaged.

When the clutch mechanism 20 is actuated, as shown in FIG. 2, the annular end section of actuating sleeve 30 remote from the nut 28 projects coaxially and slidably into one end of an annular clutch adjusting nut 33, the opposite end of which is adjustably threaded onto an annular hub or boss 34, which is integral with and projects coaxially from one end of a high-speed threading clutch gear 35. Gear 35 is secured to and surrounds coaxially thereof the outer race 36 of another ball bearing unit. The outer race 36 of this unit is separated in a conventional manner by a plurality of ball bearings 37 from the inner race 38, which is secured by a nut 39 coaxially on the end of the center bearing 13 which projects beyond the right side of frame leg 14 as shown in FIG. 1. Nut 39 projects into the open end of an annular, generally cup-shaped clutch collar 41, which is mounted in the bore of gear 35 with its open, terminal end registering with, and seated against the outer bearing race 36. The clutch collar 41 is coupled in conventional manner to the gear 35 for rotation therewith.

Mounted coaxially in the end of the actuating sleeve 30 that extends into the hub of gear 35 is an annular clutch closing ring 43 having in its inner periphery a rectangular coupling notch 43' (FIG. 3). Integral with and projecting slightly radially beyond the outer peripheral surface of ring 43 at angularly spaced points about its axis are three, generally rectangularly shaped lugs 44 (FIG. 3). Lugs 44 project through registering notches or slots 45 in the surrounding sleeve 30 to couple ring 43 to sleeve 30, and to become seated against the bottom of the counterbore in the adjusting nut 33. Ring 43 surrounds the reduced-diameter hub-section 46 of an annular clutch plate 47 (FIG. 2) having on its periphery a beveled surface 47' which is engaged by a complimentary shaped beveled surface 30' on the confronting end of sleeve 30 when clutch 20 is actuated as shown in FIG. 2. The annular hub section 46 of clutch plate 47 has thereon an integral tab 46' which projects into the notch 43' in ring 43 to couple clutch plate 47 to ring 43 for rotation therewith.

As shown more clearly in FIG. 2, clutch plate 47 is axially spaced slightly from the clutch closing ring 43; and a plurality of spherically shaped ball cams or detents 48 are mounted in the bore of sleeve 30 between ring 43 and clutch plate 47 for a purpose noted hereinafter. The ball cams 48 are separated into three groups by three rectangularly shaped spacer blocks 49, which are secured by pins 50 to the faces of the flat lug sections 44 on ring 43. Between its lug sections 44 ring 43 has formed on the face thereof three, arcuate camming surfaces 51, which as shown in FIG. 2 are inclined to the axis of ring 43, and which engage the ball cams 48 at points nearly diametrally opposite the points where the cams 48 engage clutch plate 47.

Clutch plate 47 and its hub section 46 surround, coaxially thereof, a bronze ring 55, which is keyed as at 56 to shaft 12 for limited movement axially thereof, and for rotation therewith. At one end thereof (the left end in FIG. 2) ring 55 has thereon an integral, enlarged-diameter disc flange 57, to opposite sides of which are secured flat, ring-shaped brake pads 58 and 59, respectively. Pads 58 and 59 are made from a non-asbestos rigid molded fiberous material such as sold, for example, by Scan Pac under the designation #240AF.

For the purpose of shifting clutches 20 and 20' into and out of their respective actuated positions, clutch shifting sleeves 24 and 24' have thereon shifting sleeve shoes S and S', respectively, which in FIG. 1 are shown in phantom by broken lines. Each of these shoes S and S' is connected in conventional manner to a clutch operating mechanism (not illustrated) which functions to engage or actuate clutch mechanism 20 and 20', one at a time, so that whenever one such mechanism is in its actuated position, such as for example as in the case of clutch mechanism 20 as shown in the drawings, the other clutch mechanism is disengaged, or is disposed in its non-actuated position, such as for example as shown by mechanism 20' in FIG. 1.

Referring again to FIG. 2, when the shoe S shifts sleeve 24 from its broken to its full line position as shown in this figure, the beveled surface 30' on sleeve 30 is shifted axially toward the left in FIG. 2, thereby causing the ball cams 48 to be urged radially inwardly into the positions as shown in FIG. 2. As the balls 48 are shifted radially inwardly they are urged by the tapered or inclined surfaces 51 on ring 43 toward the left in FIG. 2, and against the clutch plate 47, thereby urging plate 47 axially toward the left in FIG. 2, and into the clutch actuated position in which the pads 58 and 59 on the disc flange 57 are gripped securely and frictionally between clutch plate 47 and the outer or right hand end surface of the clutch collar 41. In this actuated position of the clutch mechanism 20, rotation of gear 35 is imparted through clutch collar 41, disc flange 57 and its pads 58, 59 to the clutch plate 47. Plate 47, in turn, imparts its rotation via the tab 46' on its hub 46 to the clutch closing ring 43, which by its lugs 44 in turn imparts its rotation to the actuating sleeve 30 and the outer ball bearing race 26. However, because of the presence of the ball bearings 27, this rotation is not imparted to the inner race 23 and the shifting sleeve 24. In this case, therefore, the shaft 12 is rotated at a relatively high speed. However, since the clutch mechanism 20' is disengaged (note the axial space between nut 33' and sleeve nut 28') the rotation of gear 35' is not imparted to shaft 12.

When it is desired to rotate shaft 12 at the lower speed provided by gear 35', the shoes S and S' shift sleeves 24 and 24' slightly to the right from their positions as shown in FIG. 1, thus causing clutch flange 47 to release the axial pressure on the disc flange 57, while the corresponding clutch flange 47' (not illustrated) in clutch mechanism 20' actuates this latter mechanism to drive shaft 12 from gear 35'.

From the foregoing, it will be apparent that the present invention provides relatively simple and compact clutch mechanisms for operating shaft 12 selectively at relatively high or low speeds. Specifically, by utilizing the generally planar disc flange 57 with the two correspondingly shaped breaking pads 58 and 59 secured to opposite sides thereof, it is possible to reduce considerably the overall size of each clutch operating mechanism. For this reason, only the slightest axial movement of each clutch plate 47 is necessary in order to engage or disengage its respective clutch mechanism. In turn, only the slightest axial movement of the sleeve nut 28 is necessary to engage or disengage clutch mechanism 20. For example, when sleeve 30 is withdrawn toward the right in FIG. 2 from its full line position to the position it would assume when sleeve nut 28 is shifted to its broken line position, the ball cams 48 will be free to ride radially outwardly along the camming surfaces 51 on ring 43, and along the beveled surface 30' on sleeve 30 as the latter is retracted. When this occurs, of course, axial pressure against the clutch plate 47 is released, and the plate therefore is free to shift slightly toward the right from its position in FIG. 2, thereby releasing the axial pressure exerted on the the clutch pads 58 and 59. As a consequence, the rotation of gear 35 and the clutch collar 41 can take place without imparting any corresponding rotation to clutch plate 47.

After prolonged use it is possible that the clutch pads 58 and 59 might exhibit some wear, which would tend to decrease the axial pressure exerted thereon during the operation of the mechanism, and therefore might possibly lead to some slippage. To compensate for any such wear, one need only to thread the adjusting nut 33 further onto the hub or boss 34 on gear 35. Normally nut 33 is secured by a set screw 61 against rotational adjustment on the hub 34. Therefore to effect such adjustment, the set screw 61 is momentarily backed off or released, after which nut 33 is adjusted on the hub 34, after which set screw 61 is threaded into a locking position in which its inner end engages the hub 34 to prevent any rotation of nut 33 relative to hub 34. As the nut 33 is threaded further onto hub 34, the ring 43, via its lugs 44, is urged by the nut 33 slightly axially toward gear 35, thereby increasing the axial pressure exerted by ring 43 against the ball cams 48, and in turn resulting in increased axial pressure on the disc flange 57 and its pads 58 and 59, when the mechanism is actuated.

While this invention has been illustrated and described in detail in connection with only certain embodiments thereof, it will be apparent that it is capable of still further modification, and that this application is intended to cover any such modifications as may fall within the scope of one skilled in the art or the appended claims.

I claim:

1. In a screw machine threading attachment having a rotatable threading shaft, and at least one drive gear rotatable coaxially of the axis of said shaft, an improved clutch mechanism for releasably connecting said one drive gear to said shaft to impart rotation thereto, comprising a generally disc-shaped clutch element keyed to said threading shaft for rotation therewith coaxially of said axis thereof, and for limited movement axially of said shaft, said clutch element having thereon opposed, generally planar surfaces disposed in parallel planes extending transversely of the axis of said shaft, a first annular member mounted for rotation on said shaft coaxially thereof, and connected to said one drive gear for rotation thereby, said first annular member being secured against movement axially of said shaft, and having thereon a generally planar surface confronting one of said planar surfaces on said clutch element, a second annular member mounted on said shaft coaxially thereof for limited movement axially of said shaft, and having on one side thereof a generally planar surface confronting on the other of said planar surfaces on said clutch element, and camming means engaged with said second annular member and operable selectively to urge said second annular member axially toward said first annular member and said clutch element from a retracted position in which said one drive gear and said first annular element are rotatable relative to said shaft, to an advanced position in which said planar surfaces on said clutch element are gripped frictionally between said planar surfaces on said first and second annular members with a compressive force sufficient to cause said rotation of said one drive gear to be transmitted by said clutch element to said shaft.

2. In a screw machine threading attachment as defined in claim 1, including at least a second drive gear rotatable coaxially of the axis of said threading shaft, and means operative to connect said second drive gear to said shaft to impart its rotation to said shaft when said second annular member is in its retracted position.

3. In a screw machine threading attachment as defined in claim 1, wherein said clutch element comprises a metal ring portion keyed to and surrounding said shaft coaxially thereof, and having thereon an integral, enlarged-diameter ring flange portion of generally disc-shaped configuration, and a pair of flat annular, fiberous pads secured to opposite sides of said ring flange portion coaxially thereof, and having planar outer surfaces lying in said parallel planes.

4. In a screw machine threading attachment as defined in claim 3, wherein said pads, are made from a molded, non-asbestos fiberous material.

5. In a screw machine threading attachment as defined in claim 1, wherein said camming means comprises a camming ring surrounding said shaft coaxially thereof and having on one side thereof at least one camming surface disposed in axially spaced confronting relation to the side of said second annular member opposite to said one side thereof, an array of camming detents mounted in the axial space between said confronting sides of said camming ring and said second annular member for limited movement radially of the axis of said shaft, and an actuating sleeve surrounding said camming ring and said detents coaxially of said shaft, and movable relative to said shaft between a first position in which said sleeve urges said detents in a direction radially inwardly of said shaft, and a second position in which said detents move in a direction radially outwardly of said shaft, said camming surface on said camming ring being inclined to the axis of said shaft and being operative upon the radially inward movement of said detents to urge said detents axially toward said second annular member thereby to urge the latter to its advanced position.

6. In a screw machine threading attachment as defined in claim 1, including means for adjusting the amount of said compressive force that is applied to said clutch element when said second annular element is urged to its advanced position.

7. In a screw machine threading attachment as defined in claim 6, wherein said adjusting means comprises means supporting said camming ring on said shaft for limited axial adjustment thereon toward and away from said first annular member.

8. In a screw machine threading attachment as defined in claim 5, including means coupling said camming ring to said second annular member and to said actuating sleeve, whereby rotation of said second annular member is imparted by said camming ring to said sleeve, and means supporting said actuating sleeve on said shaft for rotation relative thereto.

9. In a screw machine threading attachment as defined in claim 5, wherein said camming surface lies in circumferential path disposed coaxially of said camming ring, and said camming detents are spherical in configuration and are arranged in a circular array coaxially of said camming ring, and have rolling engagement with said camming surface.

10. In a screw machine threading attachment as defined in claim 9, wherein said detents are engaged with the inner peripheral surface of said actuating sleeve, and said inner peripheral surface of said sleeve has a beveled camming surface formed thereon and operative to urge said detents radially inwardly when said sleeve is moved to said first position thereof.

\* \* \* \* \*